INVENTORS
WILLIAM H. WHITMIRE
JACK S. WEBBER
ATTORNEYS

INVENTORS
WILLIAM H. WHITMIRE
JACK S. WEBBER

ATTORNEYS

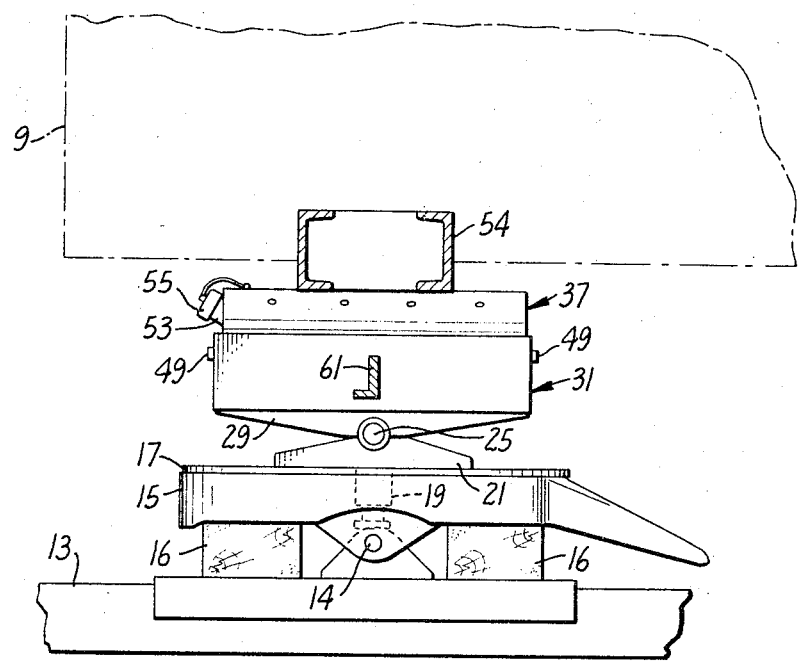

3,430,987
FIFTH WHEEL FOR VEHICLE
William A. Whitmire, Castro Valley, and Jack S. Webber, Walnut Creek, Calif., assignors to Bigge Drayage Co., a corporation
Filed May 23, 1967, Ser. No. 640,622
U.S. Cl. 280—438                                    4 Claims
Int. Cl. B62d 53/08

ABSTRACT OF THE DISCLOSURE

A fifth wheel structure for tractor-trailer vehicles of the type wherein the trailer can tilt relative to the tractor without putting a strain on the vehicle or the load wherein an arcuate member supports a rocker member in a bath of oil. In a preferred embodiment, a plastic insert of low friction coefficient rests between the two moving members.

BACKGROUND OF THE INVENTION

*Field of the invention.*—Fifth wheel structure for tractor-trailer vehicles.

*Description of the prior art.*—Complex mechanical devices were previously used to permit tilting movement but such structures were relatively expensive and could not be properly lubricated so they had a relatively short life.

SUMMARY OF THE INVENTION

An oscillating or rocking support member is provided as part of the connecting structure of a tractor-vehicle which allows the load and tractor to tilt or oscillate relative to each other so that no strain or torsion is induced into the load itself or into either the tractor or the trailer vehicles. The device is particularly applicable to structures wherein a dolly provides the rear load carrying member, the load itself comprising the connection between the dolly and the fifth wheel. This is particularly important when hauling a fragile article such as a precast concrete beam wherein the beam cannot be subjected to any substantial torsional stress without breakage. The present invention allows a sliding or rocking movement between the tractor and the trailer or other device being towed. The rocking member is oil-tight and an oil level is maintained therein so that constant lubrication is provided of the parts which move relative to each other. Further, in accordance with a preferred embodiment of the invention the frictional resistance between the rubbing parts is substantially reduced by the use of a sheet or film of a material having a low frictional coefficient such as an inert plastic.

BRIEF DESCRIPTION OF THE DRAWING

FIGURE 5 is a side view of a fifth wheel embodying the present invention showing the method of blocking when a conventional fifth wheel is employed.

FIGURE 6 is an exploded view showing the applicability of the present invention to a tractor vehicle which is not provided with the usual fifth wheel structure.

DESCRIPTION OF THE PREFERRED EMBODIMENTS

Figure 1:
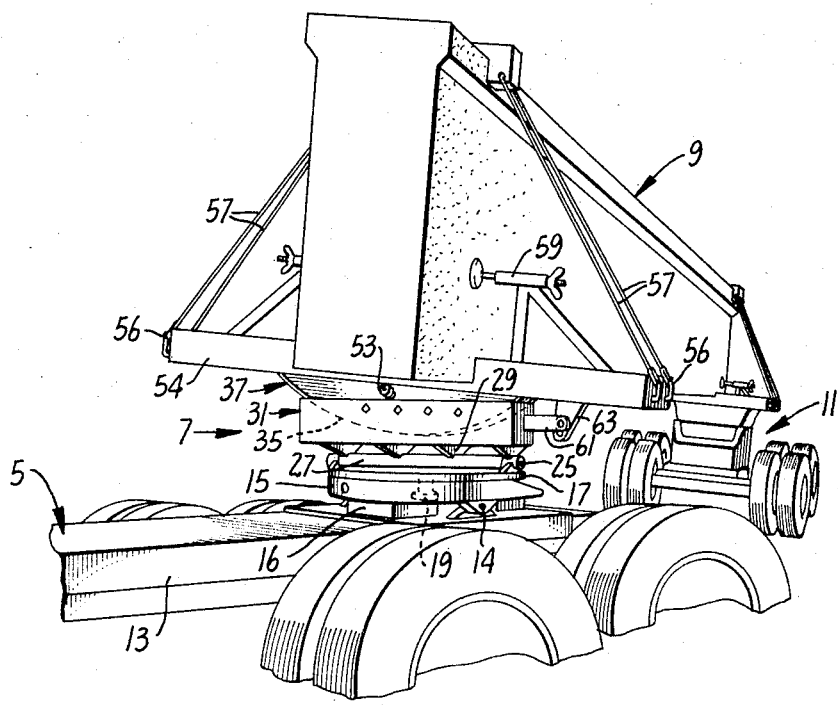
FIGURE 1 is a perspective view of a portion of a tractor with a fifth wheel thereon embodying the present invention.

Referring now to the drawings by reference characters there is shown a towing vehicle or tractor generally designated 5 having a fifth wheel structure thereon generally designated 7 on which rests the load 9 the rear portion of which is supported by a dolly 11.

Connected to the frame 13 of the tractor or other supporting vehicle or structure is a support member 15 having a plate 17 thereon mounted for rotational movement by means of a king pin 19. In the embodiments of the invention illustrated in FIGURES 1 through 5 plate 15 forms part of a standard fifth wheel assembly and is mounted on the frame of the vehicle by pivot members 14 as is well known to those skilled in the art. As will be later apparent, it is necessary to avoid a double hinge support so that when the standard fifth wheel is used, pivot 14 is blocked from movement by the members 16. Plate 17 carries a pair of bracket members 21 and 23 which hold a shaft 25. Mounted for rotation on shaft 25 is the tubular member 27 to which is welded or otherwise suitably fastened a plurality of carriers 29 which support the box structure 31. Within the box structure 31 a plurality of struts 33 hold an arcuate cradle member 35. An upper member 37 is provided with struts 39 supporting a mating arcuate bottom member 41. Preferably a sheet or film 42 of a material having a low coefficient of friction, such as plastic, is inserted between the members 35 and 41. It will be noted that the member 41 extends beyond the end struts forming a lip 43 which is retained by the members 45 and 47 fastened with suitable bols 49 through the two ends of the box structure. Also, the member 41 is provided with a plurality of holes as at 51 so that oil or other hydraulic fluid can be placed in the box, the holes permitting the oil to flow freely between the arcuate bearing surfaces formed by members 35 and 41. A suitable filler tube 53 having a cap 55 is provided for supplying oil to the structure and for checking the oil for proper level.

The member 37 carries a suitable load support member which, in the embodiment illustrated, is a cross beam 54 notched to receive a precast concrete beam 9. Suitable means 56 are provided so that the beam can be tied in place with wire ropes 57 or chain and also clamp structures 59 are provided to hold the beam in place. However, although the invention is primarily adapted for the hauling of such fragile articles, it will be understood that the invention is one of broad applicability and that any conventional trailer body might be connected to the novel fifth wheel assembly instead of the means described for carrying a precast beam.

Figure 2:
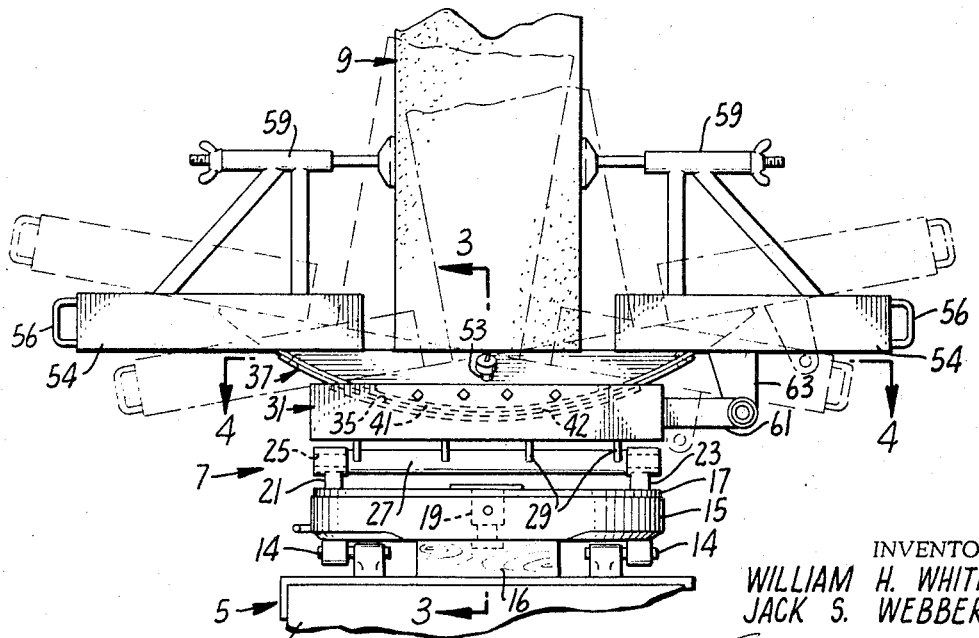
FIGURE 2 is an end view of a fifth wheel embodying the present invention, showing the manner in which the load can tilt relative to the towing vehicle.
Figure 3:
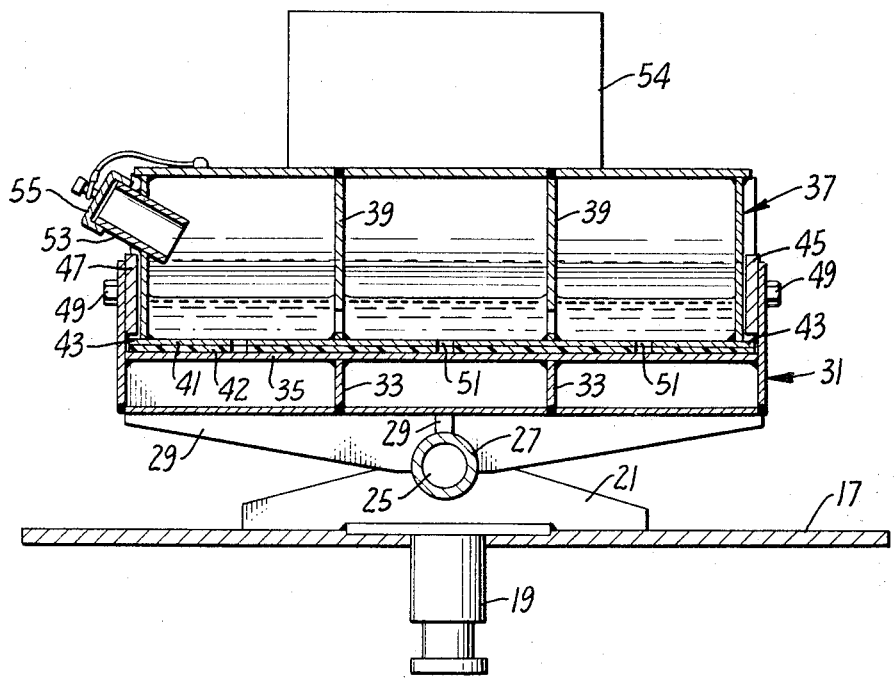
FIGURE 3 is an enlarged section on the line 3—3 of FIGURE 2.
Figure 4:
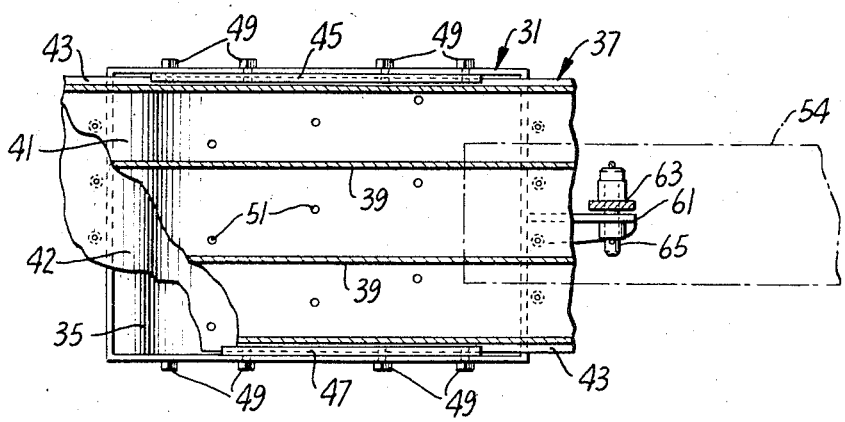
FIGURE 4 is a section on the line 4—4 of FIGURE 2.

Normally the beam 54 is free to rock from side to side as is illustrated in FIGURE 2 wherein solid lines show the beam in its center position and in dash lines show possible alternate positions as the structure twists. Further, completely flexible movement is provided by the mounting rod 25 and the king pin 19.

When the structure is being carried empty, it is desirable to provide some locking means and this can take the form of brackets 61 and 63 extending from members 31 and 54 with a suitable pin 65 for linking the two together. Of course, it will be understood that the pin would only be used while the device was either being carried empty or being loaded and normally the pin would be removed during use.

In the embodiment of the invention shown in FIGURE 6, a standard fifth wheel is not used, but the structure is otherwise the same. Thus the vehicle is provided with a lower bearing surface 67 on which plate 17 is rotatably mounted by means of bolt 69. Naturally, with this structure, no blocking is necessary.

Although in the foregoing, it has been assumed that the oscillating structure is mounted on a tractor, the same structure can be mounted on a trailer or dolly rather than just on the tractor.

It is believed apparent from the foregoing that I have provided a novel fifth wheel structure of generally improved design, wherein the parts move in an oil bath or over a plastic member and wherein strain on the load is minimized.

We claim:
1. A fifth wheel structure comprising in combination;
   (a) a mounting attached to a tractor vehicle by means of a king pin whereby the mounting can rotate relative thereto,
   (b) a bearing on said mounting at right angles to said king pin,
   (c) a box structure mounted on said bearing whereby said box structure can tilt forward or backward relative to said mounting structure,
   (d) said box structure having an arcuate bottom member and
   (e) a load bearing member mounted over the box structure and having mating arcuate member in contact with the arcuate bottom member.
2. The structure of claim 1 wherein the mating arcuate member has lips extending outwardly from each side thereof and wherein the box structure has inwardly extending members, engaging said lips but permitting the mating arcuate member to rotate relative to the arcuate bottom member.
3. The structure of claim 1 wherein said box structure is oil-tight and has means permitting an oil level to be maintained therein.
4. The structure of claim 1 having a sheet of material having a low coefficient of friction between said arcuate bottom member and said mating arcuate member.

References Cited

UNITED STATES PATENTS

| | | | |
|---|---|---|---|
| 2,726,879 | 12/1955 | Viallant | 280—438 |
| 2,833,561 | 5/1958 | Vaugoyeau | 280—438 |
| 3,123,380 | 3/1964 | Grim et al. | 280—404 |
| 3,156,487 | 11/1964 | Bigge | 280—404 |
| 3,232,636 | 2/1966 | Buchanan | 280—404 |
| 3,309,111 | 3/1967 | Vaugoyeau | 280—438 |

LEO FRIAGLIA, *Primary Examiner.*

U.S. Cl. X.R.

280—404